(12) United States Patent
Rodriguez et al.

(10) Patent No.: US 10,198,873 B2
(45) Date of Patent: Feb. 5, 2019

(54) COMMON GEOMETRIC PRIMITIVE ASSOCIATED WITH MULTIPLE GEOMETRIC PRIMITIVES

(71) Applicant: Apple Inc., Cupertino, CA (US)

(72) Inventors: Alejandro A. Rodriguez, Saratoga, CA (US); Daniel I. Lipton, Belmont, CA (US)

(73) Assignee: Apple Inc., Cupertino, CA (US)

( * ) Notice: Subject to any disclaimer, the term of this patent is extended or adjusted under 35 U.S.C. 154(b) by 36 days.

(21) Appl. No.: 15/273,354

(22) Filed: Sep. 22, 2016

(65) Prior Publication Data

US 2018/0082471 A1    Mar. 22, 2018

(51) Int. Cl.
    *G06T 17/10*    (2006.01)
    *G06T 19/20*    (2011.01)
    *G06T 11/20*    (2006.01)

(52) U.S. Cl.
    CPC .............. *G06T 19/20* (2013.01); *G06T 11/20* (2013.01); *G06T 2219/2021* (2013.01)

(58) Field of Classification Search
    None
    See application file for complete search history.

(56) References Cited

U.S. PATENT DOCUMENTS

| 2002/0097241 A1* | 7/2002 | McCormack | G06T 1/60 345/423 |
| 2006/0094951 A1* | 5/2006 | Dean | A61F 2/30942 600/407 |
| 2014/0267375 A1* | 9/2014 | Kilgard | G06T 7/0079 345/611 |

OTHER PUBLICATIONS

Segal et al. "Partitioning Polyhedral Objects into Nonintersecting Parts", IEEE Comput. Graphics, 8 (1988) 53-67.*
ArcMap Shared Geometry, "Editing Shared Geometry", downloaded @ https://web.archive.org/web/20160530021241/http://desktop.arcgis.com/en/arcmap/10.3/manage-data/editing-fundamentals/editing-shared-geometry.htm, available since May 30, 2016.*
"Common Polygon Editing Tasks", downloaded @ http://webhelp.esri.com/arcgisdesktop/9.3/print.cfm?TopicName=Common%20polygon%20editing%20tasks, available since May 14, 2009.*

* cited by examiner

*Primary Examiner* — Yingchun He
(74) *Attorney, Agent, or Firm* — Sterne, Kessler, Goldstein & Fox, PLLC

(57) ABSTRACT

Disclosed herein are system, method, and computer program product embodiments for identifying and processing a common geometric primitive associated with multiple geometric primitives. In some embodiments, a first geometric primitive including a first set of end points and a second geometric primitive including a second set of end points are obtained. A common point that is shared by the first geometric primitive and the second geometric primitive is determined based on at least some of the first and second sets of end points. The common geometric primitive is generated based on at least the common point. The common geometric primitive is associated with the first geometric primitive and the second geometric primitive so that a change to the common geometric primitive is applied to the first geometric primitive and the second geometric primitive.

20 Claims, 10 Drawing Sheets

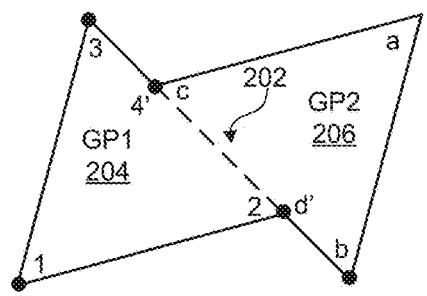
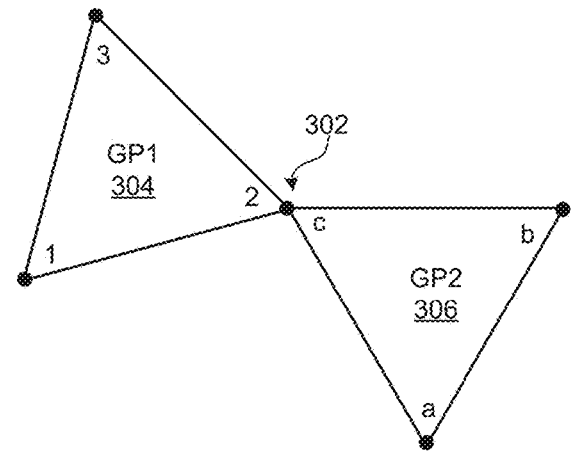
FIG. 2    FIG. 3
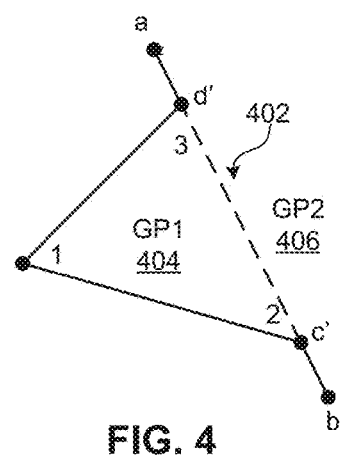
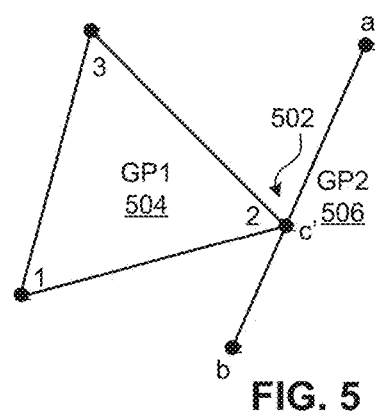
FIG. 4    FIG. 5
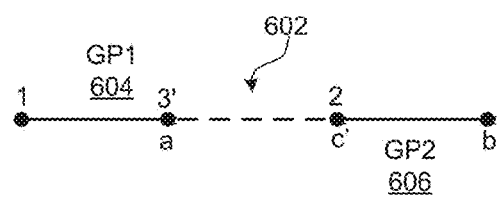
FIG. 6

COMMON GEOMETRIC PRIMITIVE ASSOCIATED WITH MULTIPLE GEOMETRIC PRIMITIVES

BACKGROUND

Field

This disclosure generally relates to identifying and processing a common geometric primitive associated with multiple geometric primitives.

Related Art

In today's world, users often interact with computer graphics objects displayed on electronic device screens using computer software, such as for digital map, computer-aided design, city planning, entertainment, education, etc. For example, via a graphical user interface (GUI), a user may create geometric primitives, such as polygons, lines, or points, with reference to computer graphics objects that are displayed on the screen and then edit those geometric primitives as desired. A number of factors may affect user experience on creating and editing the geometric primitives including, for example, the complexity of the geometric primitives, the usability of the software and GUI, the performance of the computer hardware, and the proficiency of the user. As a result, the operations can be unfriendly to the user, sometimes even frustrating, especially when the user is editing a geometric primitive that is common to multiple geometric primitives.

SUMMARY

This disclosure generally relates to identifying and processing a common geometric primitive associated with multiple geometric primitives. In some embodiments, the multiple geometric primitives may include polygons and lines, each of which includes a set of end points. The common geometric primitive, such as a common point or a common line, may be on the multiple geometric primitives. Once the common geometric primitive is identified, it may be automatically associated with the multiple geometric primitives so that any change made by a user to the common geometric primitive can be automatically applied to the multiple geometric primitives as well. In some embodiments, the common geometric primitive may be displayed to the user in a manner that is different from the manner in which the multiple geometric primitives are displayed for ease of distinguishing. In some embodiments, the common geometric primitive and its association with the multiple geometric primitives may be temporary. For example, the common geometric primitive may be removed, while the multiple geometric primitives are still maintained on the screen, when the user no longer uses the common geometric primitive.

Some embodiments relate to a method for generating a common geometric primitive. A first geometric primitive including a first set of end points and a second geometric primitive including a second set of end points may be obtained. A common point that is shared by the first geometric primitive and the second geometric primitive may be determined based on at least some of the first and second sets of end points. The common geometric primitive may be generated based on at least the common point. The common geometric primitive may be associated with the first geometric primitive and the second geometric primitive so that a change to the common geometric primitive is applied to the first geometric primitive and the second geometric primitive.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

FIGS. 2-6 illustrate various examples of a common geometric primitive associated with multiple geometric primitives, according to various embodiments of the disclosure.

Figure 1:
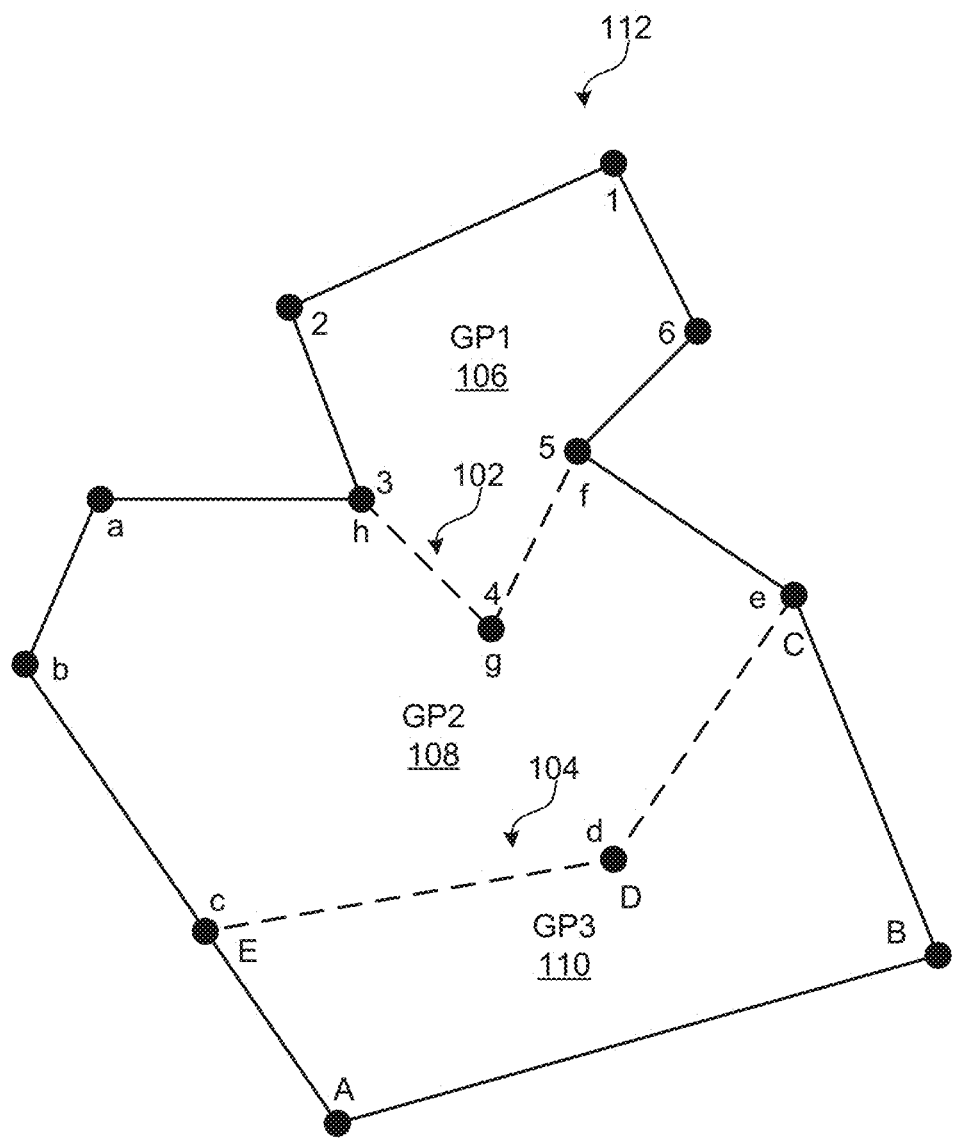
FIG. 1 illustrates an example of common lines each associated with multiple polygons, according to some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Provided herein are system, apparatus, device, module, component, method and/or computer program product embodiments, and/or combinations and sub-combinations thereof, for identifying and processing a common geometric primitive associated with multiple geometric primitives. A geometric primitive may be any geometric object that a computer graphics system can process (e.g., create, store, edit, display, etc.). For example, a geometric primitive may be a polygon, a line, a point, a circle, an ellipse, to name a few examples. In some embodiments, a common geometric primitive may be any geometric primitive that is shared by at least two geometric primitives, such as but not limited to, a common line, a common line segment, or a common point. In other words, a common geometric primitive may be a geometric primitive that is overlapped by at least two geometric primitives.

According to some embodiments, a GUI may be provided to a user to facilitate the user to input a command of drawing multiple geometric primitives, selecting multiple existing geometric primitives presented to the user, or slicing an initial geometric primitive into multiple geometric primitives. A common geometric primitive that is shared by at least two geometric primitives may be automatically identified and associated with the geometric primitives sharing the common geometric primitive. That is, the common geometric primitive may be considered a "parent geometric primitive" of its "child geometric primitives." As a result, any further edit to the common geometric primitive may be automatically reflected to its child geometric primitives without user intervention. Therefore, user experience on handling multiple geometric primitives having a common geometric primitive can be improved as the user no longer needs to manually select the common geometric primitive and edit the parent and child geometric primitives one by one in case any change needs to be made to the common geometric primitive. Moreover, by automatically associating the common geometric primitive with its child geometric primitives, the consistency between them can be ensured.

According to some embodiments, the common geometric primitive may be automatically and dynamically identified at runtime. In other words, the common geometric primitive may be determined when a need arises, for example, in response to a command of slicing an initial geometric primitive into multiple geometric primitives or a command of drawing or selecting multiple geometric primitives that at least partially overlap each other. Once the common geometric primitive is identified and created, instead of permanently storing it in a computing device, the common geometric primitive may be temporarily preserved to allow the user to interact with the common geometric primitive. The user may remove the common geometric primitive when the user no longer utilizes the common geometric primitive, while still keeping the child geometric primitives. Accordingly, the computing device and its finite computing resources are free from the extra burden of storing each newly created common geometric primitive; such computing resources are thus available for use by other programs running in the computing device. Thus, embodiments help solve the technological problem of multiple applications competing for limited computing resources.

FIG. 1 illustrates an example of common lines 102 and 104 each associated with two of polygons 106, 108, and 110, according to some embodiments of the disclosure. In some embodiments, polygon GP1 106, polygon GP2 108, and polygon GP3 110 may be created by slicing a polygon 112 along common lines 102 and 104, respectively. Common line 102 is on both polygon GP1 106 and polygon GP2 108, and common line 104 is on both polygon GP2 018 and polygon GP3 110. According to some embodiments, any change (e.g., moving, rotating, flipping, or any editing) to common line 102 can be applied to both polygon GP1 106 and polygon GP2 108. Similarly, any change to common line 104 can be applied to both polygon GP2 108 and polygon GP3 110. As an example, when a user rotates common line 102 90 degrees clockwise, both polygon GP1 106 and polygon GP2 108 will be automatically rotated 90 degrees clockwise as well. The user does not need to manually and separately rotate polygon GP1 106 and polygon GP2 108 in order to match the rotated common line 102 to ensure consistency.

In some embodiments, a common line may include multiple common line segments. For example, common line 102 includes a common line segment 3h-4g defined by two common points 3h and 4g and another common line segment 4g-5f defined by two common points 4g and 5f. Similarly, common line 104 includes a common line segment cE-dD defined by two common points cE and dD and another common line segment dD-eC defined by two common points dD and eC.

As used herein, for illustrative and not limiting purposes, a "line segment" refers to a part of a "line" that is bounded by two distinct end points and includes every internal point on it between the two end points. A "line" may include one or more line segments. A "polygon" may include multiple line segments (edges) that are connected to one another. A polygon may be a closed polygon in which all the line segments connect up or an open polygon in which not all the line segments connect up. Each line segment (edge) of a polygon is bounded by two distinct end points (vertices of polygon). That is, in the present disclosure, an "end point" may be a vertex of a closed polygon or an open polygon. For example, each vertex of closed polygon GP1 (1, 2, 3, 4, 5, and 6) is considered an end point of a geometric primitive in the present disclosure. As described above, common line 102 and common line 104 are examples of common geometric primitives shared by multiple geometric primitives. Each common line 102 or 104 may be considered an open polygon with multiple line segments. For example, each vertex of open polygon 102 (3h, 4g, and 5f) is considered an end point of a geometric primitive in the present disclosure.

As shown in FIG. 1, each polygon includes a set of vertices. A vertex may be an end point where two or more line segments (edges) meet in the polygon. A polygon can be defined by the set of vertices (end points), and each edge of the polygon may be defined by two vertices (end points). For example, polygon GP1 106 includes six vertices: 1, 2, 3, 4, 5, and 6, polygon GP2 108 includes 8 vertices: a, b, c, d, e, f, g, and h, and polygon GP3 110 includes five vertices A, B, C, D, and E. In some embodiments, each vertex is associated with a position on the screen, such as a pair of two-dimensional (2D) coordinates (x, y) in the X and Y axis. The values of the 2D coordinates for each vertex may be stored in any suitable data type in the computing device, and each polygon may be stored in the computing device in any suitable data structure by the set of vertices. For example, polygon GP1 106 may be stored in the computing device as a list of vertices [1|(x1, y1), 2|(x2, y2), 3|(x3, y3), 4|(x4, y4), 5|(x5, y5), 6|(x6, y6)], where each vertex is associated with its position.

In some embodiments, the set of vertices may be stored in a consecutive order. Thus, any vertex in the set of vertices is adjacent to two other vertices in the list. That is, any vertex in the set of vertices is either a predecessor vertex or a successor vertex of its two adjacent vertices. In some embodiments, a line segment (edge) of a polygon is formed between two vertices that are adjacent to each other. For example, vertices 3 and 5 of polygon GP 1 106 are not connected by a line segment as they are not adjacent to each other in the list of vertices. In some embodiments, the set of vertices are stored based on the direction in which the polygon is formed. For example, a polygon formed by vertices in counter clockwise order [1, 2, 3, 4, 5, 6] may be different from another polygon formed by the same vertices but in clockwise order [1, 6, 5, 4, 3, 2].

As shown in FIG. 1, each common line 102 or 104 includes multiple end points, which are vertices of the corresponding child polygons. Specifically, common line 102 includes three common points: 3h, 4g, and 5f, each of which is a common vertex of both polygon GP1 106 and polygon GP2 108. Similarly, common line 104 includes three common points: cE, dD, and eC, each of which is a common vertex of both polygon GP2 108 and polygon GP3 110. For example, the label of common point "3h" means that it is both vertex 3 of polygon GP1 106 and vertex h of polygon GP2 108. As described above, each end point of a common line may be stored in the computing device in any data type by its 2D coordinates, and each common line may be stored in the computing device in any suitable data structure by the set of end points in a consecutive order. In some embodiments, the data structure for storing a common line may include data of the child polygons of the common line. As described above, child polygons are those polygons that share the common line. For example, common line 102 may be represented as [(GP1, GP2), 3h|(x3, y3), 4g|(x4, y4), 5f|(x5, y5)], where (GP1, GP2) are the child polygons of common line 102.

In some embodiments, common lines and the child polygons may be displayed (or presented) to users in different manners. As shown in FIG. 1, common lines 102 and 104 are displayed with dashed lines, while the remaining lines of polygon GP1 106, polygon GP2 108, and polygon GP3 110 are displayed in solid lines. It is to be appreciated that the manners in which a common line or its child polygons are presented may vary in other embodiments, such as in different colors.

In some embodiments, instead of slicing a polygon into multiple polygons sharing one or more common lines, a common line may be generated by separately drawing multiple polygons that at least partially overlap one another. In some embodiments, a user may first draw polygon GP1 106 and then draw polygon GP2 108 that is partially overlapped with polygon GP1 106 at common line 102. The user may further draw polygon GP3 that is overlapped with polygon GP2 108 at common line 104. In some embodiments, an offset margin may be set when determining whether the multiple polygons overlap one another because often times it is difficult for a user to draw the overlapped portions that are precisely matched. The offset margin may be set as an absolute value, such as less than 3 pixels in each of X and Y axis, or a relative value, such as less than 1%.

In some embodiments, a common line may be generating by a user selecting multiple existing polygons displayed on the screen that least partially overlap one another. In some embodiments, polygons GP1 106, GP2 108, and GP3 110 may already exist (not created by slicing) and be displayed to the user. The user may select polygons GP1 106, GP2 108, and GP3 110 for further editing.

As described above, the common geometric primitive is not limited to the common lines as illustrated in FIG. 1. The common geometric primitive can be common points as well in some embodiments. In addition, the child geometric primitives are not limited to polygons as illustrated in FIG. 1. The child geometric primitives can be polygons, lines, points, etc., or any combination thereof in some embodiments. FIGS. 2-6 illustrate various examples of a common geometric primitive associated with multiple geometric primitives, according to various embodiments of this disclosure.

FIG. 2 illustrates a common line segment 202 associated with a polygon GP1 204 and a polygon GP2 206. In the embodiment illustrated in FIG. 1, each end point of a common line is a vertex of both child polygons. For example, common points 3h of common line 102 is both vertex 3 of polygon GP1 106 and vertex h of polygon GP2 108. The same can be found for other end points, such as common points 4g and 5f of common line 102 and common points cE, dD, and eC of common line 104. Different from the example embodiment described above with respect to FIG. 1, each end point of common line segment 202 in FIG. 2 is a vertex of either child polygon GP1 204 or child polygon GP2 206, but not both. For example, common point 2d' is a vertex 2 of polygon GP1 204, but not any vertex of polygon GP2 206. Instead, common point 2d' is an internal point d' on the edge c-d of polygon GP2 206. Similarly, common point 4'c is a vertex c of polygon GP2 206, but not any vertex of polygon GP1 204. Instead, common point 4'c is an internal point 4' on the edge 2-3 of polygon GP1 204. That is, a common line segment is not limited to the entire edge of the child polygons, but instead, can be a portion of an edge of a child polygon. As shown in FIG. 2, common line segment 202 is a portion of edge 2-3 of polygon GP1 204 and also a portion of edge b-c of polygon GP2 206. Similar to FIG. 1, since common line segment 202 is associated with both child polygon GP1 204 and polygon GP2 206, any change to common line segment 202 can be automatically applied to both child polygon GP1 204 and polygon GP2 206.

FIG. 3 illustrates a common point 302 associated with a polygon GP1 304 and a polygon GP2 306. Different from FIG. 1 in which the common geometric primitives are lines, in some embodiments, a common geometric primitive can be a common point, such as a vertex 2c of both child polygon GP1 304 and polygon GP2 306 shown in FIG. 3. Common point 302 is both a vertex 2 of polygon GP1 304 and a vertex c of polygon GP2 306. Similar to FIG. 1, since common point 302 is associated with both child polygon GP1 304 and polygon GP2 306, any change to common point 302 can be automatically applied to both child polygon GP1 304 and polygon GP2 306.

FIG. 4 illustrates a common line segment 402 associated with a polygon GP1 404 and a line GP2 406. Different from FIG. 1 in which the child geometric primitives are polygons, in some embodiment, at least one child geometric primitive can be a line, such as line GP2 406 shown in FIG. 4. As described above, line GP2 406 may be stored in the computing device in any suitable data structure by the set of end points in a consecutive order, e.g., [a|(xa, ya), yb)] or [b|(xb, yb), ya)]. Common line segment 402 includes two common points 3d' and 2c.' Common point 3d' is a vertex 3 of polygon GP1 404 and an internal point d' of line GP2 406. Common point 2c' is a vertex 2 of polygon GP1 404 and an internal point c' of line GP2 406. Similar to FIG. 1, since common line segment 402 is associated with both child polygon GP1 404 and child line GP2 406, any change to common line segment 402 can be automatically applied to both child polygon GP1 404 and child line GP2 406.

FIG. 5 illustrates a common point 502 associated with a polygon GP1 504 and a line GP2 506. Common point 502 is a vertex 2 of polygon GP1 504 and an internal point c' of line GP2 506. Similar to FIG. 1, since common point 502 is associated with both child polygon GP1 504 and child line GP2 506, any change to common point 502 can be automatically applied to both child polygon GP1 504 and child line GP2 506.

FIG. 6 illustrates a common line segment 602 associated with a line GP1 604 and a line GP2 606. Each common point 3'a or 2c' is a vertex of one child line and an internal point of the other child line. For example, end point 2'c is a vertex 2 of line GP1 604 and an internal point c' of line GP2 606. Common point 3'a is a vertex a of line GP2 606 and an internal point 3' of line GP1 604. Similar to FIG. 1, since common line segment 602 is associated with both child line GP1 604 and line GP2 606, any change to common line segment 602 can be automatically applied to both child line GP1 604 and line GP2 606.

According to the various embodiments described above with respect to FIGS. 1-6, it is to be appreciated that a common geometric primitive, such as but not limited to a common line, a common line segment, or a common point, can be automatically identified from multiple child geometric primitives, such as but not limited to polygons, lines, or line segments, and then associated with the child geometric primitives so that any further change to the common geometric primitive can be reflected to the child geometric primitives without human intervention. It is also to be appreciated that the manner in which the child geometric primitives are created is not limited and can be, for example, slicing a geometric primitive or drawing or selecting each child geometric primitive individually. It is further to be appreciated that an end point of a common geometric primitive is not limited to an end point (e.g., vertex of a polygon) of both child geometric primitives and can be an internal point of one of the child geometric primitives. The embodiments of identifying and processing a geometric primitive associated with multiple geometric primitives, such as the ones described above with respect to FIGS. 1-6 (although not limited to such), are discussed in detail below with respect to FIGS. 7-12.

Figure 7:
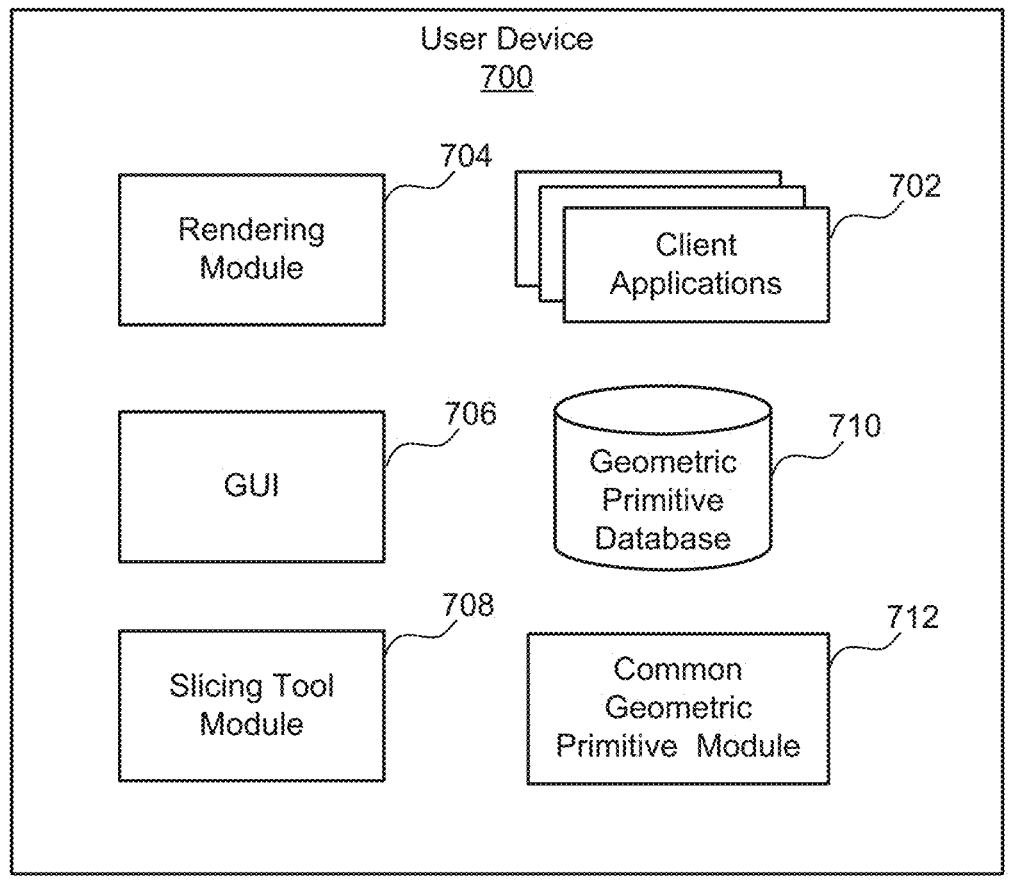
FIG. 7 is a block diagram of a user device, according to some embodiments of the disclosure.

FIG. 7 is a block diagram of a user device 700, according to some embodiments of the disclosure. User device 700 may be any electronic device having a screen, such as a laptop computer, desktop computer, netbook computer, server computer, handheld device (e.g., dumb or smart phone, tablet, etc.), wearable device (e.g., eyeglasses, wrist watch, etc.), virtual reality (VR) or argument reality (AR) device (e.g., a VR/AR headset), in-vehicle infotainment system, gaming console, television set, media center, set-top box, global positioning system (GPS), printer, etc. User device 700 includes client applications 702, a rendering module 704, a GUI 706, a slicing tool module 708, a geometric primitive database 710, and a common geometric primitive module 712. It is to be appreciated that user device 700 may include other components in addition to or in place of the components illustrated in FIG. 7 without departing from the scope and spirit of this disclosure.

Client applications 702 may be any software application running on user device 700 in which the common geometric primitive identifying and processing techniques described in this disclosure can be implemented. In one example, client applications 702 may include a digital map application in which a common edge of boundaries of a road and a shoulder needs to be identified and processed. In another example, client applications 702 may include a digital book that allows a user to interact with computer graphics objects displayed on the screen, such as slicing, moving, and editing a computer graphics object comprised of polygons. In still another example, client applications 702 may include an interior-design software by which a user can create, move, and delete virtual furniture and household goods. In the examples described above, and any other suitable client applications, there may be a need to provide the function of automatically identifying and processing common geometric primitives at runtime to facilitate users' interaction with computer graphics objects displayed on the screen (not shown) of user device 700. In some embodiments, such a function may be implemented and packaged as a software module (e.g., including geometric primitive database 710 and common geometric primitive module 712) that can be embedded into client applications 702 or invoked by client applications 702 via application programming interfaces (APIs). It is to be appreciated that in some embodiments, instead of being utilized by any third-party client applications 702, the function of common geometric primitive identifying and processing may be implemented as a dedicated, standalone application.

Rendering module 704 may render any geometric primitives, including child geometric primitives and common geometric primitives and present them on the screen of user device 700. In some embodiments, rendering module 704 may also control the manner in which a geometric primitive is presented. For example, an initial geometric primitive may be presented in a first manner. Once a user slices, e.g., via slicing tool module 708, the initial geometric primitive into multiple geometric primitives, each sliced geometric primitive may be presented in the same first manner as the initial geometric primitive or in a different manner. Once a common geometric primitive, e.g., a common line, is identified from the sliced geometric primitives, the common geometric primitive may be rendered by rendering module 704 in a second matter that is different from the first manner for ease of distinguishing. As described above, rendering module 704 can render the child geometric primitives and common geometric primitives in any manner such as those known in the art including various line styles, colors, shadows, etc.

GUI 706 may be rendered by rendering module 704 on the screen of user device 700 according to client applications 702, which allows a user to interact with computer graphics objects generated by client applications 702. For example, GUI 706 may include GUI elements to facilitate the user to interact with graphic primitives, such as drawing, slicing, moving, rotating, deleting, etc. In some embodiments, GUI 706 may include GUI elements that are dedicated to allow the user to edit common geometric primitives once they are identified and presented to the user by user device 700. As described above, any further change to the common geometric primitives, such as edits made, are captured by GUI 706 and provided to other components, for example, common geometric primitive module 712 so that the same changes can be automatically reflected to the child geometric primitives as well. The resulting changes to the child geometric primitives may be rendered by rendering module 704 and presented to the user via GUI 706.

Slicing tool module 708 may be part of client applications 702 or a standalone tool that allows a user to slice any geometric primitive presented on the screen of user device 700 into multiple geometric primitives. In some embodiments, invoking this function may automatically trigger common geometric primitive module 712 at runtime to identify any common geometric primitives generated from the slicing. It is to be appreciated that the determination and generation of a common geometric primitive can be triggered by other tools or functions besides slicing, such as a drawing tool module (not shown) that allows the user to draw multiple geometric primitives individually, which may share a common geometric primitive, or a selecting tool module (not show) that allows the user to select multiple existing geometric primitives that share a common geometric primitive.

Geometric primitive database 710 may be used for storing data of geometric primitives, for example, the geometric primitives created and used in client applications 702. Geometric primitive database 710 may store data of common geometric primitives identified and processed by common geometric primitive module 712. In some embodiments, data of a common geometric primitive that is generated at runtime may be stored temporarily and can be removed from geometric primitive database 710 once the common geometric primitive is no longer in need. In one example, the data of the common geometric primitives is stored in main memory or other volatile storage (as part of client applications 702) and deleted after use. In another example, the data of the common geometric primitive is stored in geometric primitive database 710 in a persistent memory and deleted after use. In still another example, geometric primitive database 710 is split across both persistent memory and main/volatile memory, and the data of the common primitive is stored in main memory as part of the database and deleted after use. The lifetime of data of other geometric primitives may be determined by client applications 702. As described above with respect to FIG. 1, each geometric primitive may be stored in any suitable data structure, e.g., lists, arrays, hashes, etc., by the set of end points in a consecutive order. Each end point may be stored in geometric primitive database 710 (in a persistent memory) in any suitable data type, e.g., floating-point, double, integer, etc., by its position represented by 2D coordinates. In some embodiments, data stored in geometric primitive database 710 of a common geometric primitive may further include information about the child geometric primitives as described above.

Common geometric primitive module 712 may obtain data of geometric primitives of interest, for example, from geometric primitive database 710 or client applications 702, whenever a need for identifying common geometric primitives from those geometric primitives arises. The triggering events may include user interaction with specific tools or functions, such as slicing tool module 708, and the user's manually selection of a specific GUI element in GUI 706 for performing the common geometric primitive identifying and processing function. As described above, data of each geometric primitive obtained by common geometric primitive module 712 may include data of the set of end points of the geometric primitives, such as 2D coordinates of each vertex of a polygon.

Common geometric primitive module 712 may also determine one or more common points, each of which is included in at least two of the obtained geometric primitives. As described below in detail with respect to FIGS. 10 and 11, the determination of each common point is performed by common geometric primitive module 712 based on at least some of the end points of the multiple geometric primitives in various ways.

Common geometric primitive module 712 may further generate a common geometric primitive based on the determined one or more common points. As described below in detail with respect to FIG. 12, in some embodiments, each common point is associated with its child geometric primitives and is compared with the set of end points of each of its child geometric primitives to determine whether any pair of the common points shall be connected to form a common line segment.

Once a common geometric primitive is generated by common geometric primitive module 712, common geometric primitive module 712 may store its data to geometric primitive database 710, which includes the information about the child geometric primitives. As a result, any change made to the common geometric primitive that is captured, for example by GUI 706, may be provided to common geometric primitive module 712 so that common geometric primitive module 712 can instruct client applications 702 or rendering module 704 to apply the same change to the associated child geometric primitives based on the stored information of the child geometric primitives. In case a command of removing the common geometric primitive is received via GUI 706, common geometric primitive module 712 can remove data of the common geometric primitive from geometric primitive database 710.

Methods of determining, generating, and presenting a common geometric primitive according to some embodiments shall now be discussed in greater detail. The methods may be implemented by at least some components in FIG. 7.

Figure 8:
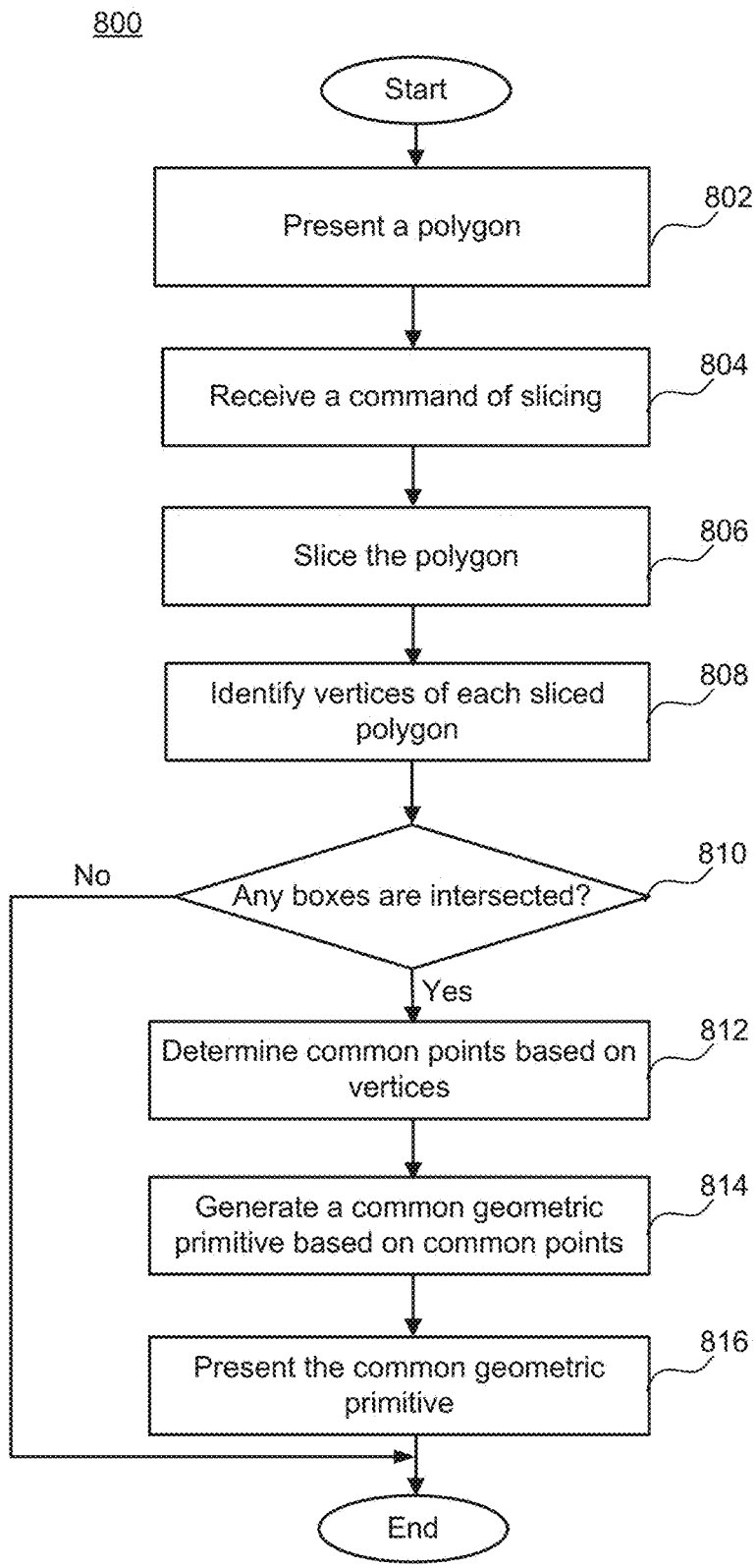
FIG. 8 is a flowchart for an example method for presenting a common geometric primitive, according to some embodiments of the disclosure.

FIG. 8 is a flowchart for an example method 800 for presenting a common geometric primitive, according to some embodiments of the disclosure. For illustrative purposes and not limitation, method 800 is described with regard to FIGS. 1 and 7. It is to be appreciated that not all steps may be needed to perform the disclosure provided herein. Further, some of the steps may be performed simultaneously, or in a different order than shown in FIG. 8, as will be understood by a person of ordinary skill in the art.

At 802, a polygon may be presented. The polygon may be presented by rendering module 704 on the screen of user device 700 to a user in a first manner. In some embodiments, GUI 706 may be presented to the user as well to allow the user to interact with the presented polygon. For example, the polygon may be boundaries of a computer graphics object, such as a road on a digital map, a rabbit in a digital book, or a room in a digital floor plan. Referring to FIG. 1, polygon 112 may be presented to the user in solid lines. Data of polygon 112 may be stored in geometric primitive database 710 by the set of vertices, e.g., [1, 2, 3/h, a, b, c/E, A, B, e/C, 5/f, 6].

At 804, a command of slicing the presented polygon is received. In some embodiments, the command may be received via GUI 706 from the user. As part of GUI 706, a GUI element may allow the user to invoke slicing tool module 708 to slice the polygon into a number of sliced polygons. Referring to FIG. 1, a command may be received from the user to slice polygon 112.

At 806, the presented polygon is sliced into a number of polygons. In some embodiments, the slicing may be performed by slicing tool module 708, and the sliced polygons may be presented on the screen of user device 700 by rendering module 704. Referring to FIG. 1, polygon 112 is sliced into three sliced polygons: polygon GP1 106, polygon GP2 108, and polygon GP3 110.

At 808, vertices of each sliced polygon are identified. In some embodiments, common geometric primitive module 712 may identify the vertices of each sliced polygon. Although the data of vertices of polygon 112 may be stored in geometric primitive database 710, vertices of each newly-sliced polygon may need to be identified, including some vertices that are not in the set of vertices of polygon 112. Referring to FIG. 1, a set of vertices 1, 2, 3, 4, 5, and 6 are identified for polygon GP1 106, a set of vertices a, b, c, d, e, f, g, and h are identified for polygon GP2 108, and a set of vertices A, B, C, D, and E are identified for polygon GP3 110. In those three sets of identified vertices, some vertices, i.e., 4g and dD, are not parts of the set of vertices of polygon 112 because they are newly created by slicing.

At 810, whether any boxes of the sliced polygons are intersected is determined. A "box" of a polygon or any geometric primitive referred in this disclosure may be a rectangle enclosing the corresponding geometric primitive such that each end point of the geometric primitive is on the sides of the rectangle. In some embodiments, each side of the rectangle is along the X or Y axis of the screen of user device 700, respectively. If the boxes of two geometric primitives are not intersected at all, then it means the two geometric primitives are distanced enough not to have any common geometric primitive. Accordingly, method 800 ends because no common geometric primitive would be identified. It is to be appreciated that 810 is optional and can be skipped in some situations including, for example, when the two polygons are created by slicing an initial polygon because the slicing path itself is a common line.

At 812, if it is determined at 810 at there are at least two boxes of the sliced polygons are intersected, then one or more common points are determined based on at least some of the vertices of the sliced polygons. Each common point may be on at least two sliced polygons and determined based on at least two vertices of a sliced polygon. In some embodiments, this determination may be made by common geometric primitive module 712. The details of determining common points are described below with respect to FIGS. 10 and 11 in various embodiments. Referring to FIG. 1, three common points 3h, 4g, and 5f are determined as common points of polygon GP1 106 and polygon GP2 108, and three common points cE, dD, and eC are determined as common points of polygon GP2 108 and polygon GP3 110. Although each common point in FIG. 1 is a vertex of both child polygons, as discussed above with respect to FIGS. 2, 4, 5, and 6, it is to be appreciated that in some embodiments, a common point may not be a vertex of one of its child polygons (or not an end point of one of its child geometric primitive in general). But still, the common point is on both child geometric primitives and can be determined by at least two end points.

At 814, a common geometric primitive may be generated based on the identified common points. In some embodiments, this generation may be performed by common geometric primitive module 712. It is to be appreciated that more than one common geometric primitive, either in the same type or different types (e.g., common points and common lines), may be generated. For example, a common line segment may be generated by connecting two common points as described below in detail with respect to FIG. 12. Referring to FIG. 1, common lines 102 and 104 are generated based on one set of common points 3h, 4g, and 5f, and another set of common points cE, dD, and eC, respectively. For example, common line 102 includes a common line segment 3h-4g connecting common points 3h and 4g and another common line segment 4g-5f connecting common points 4g and 5f. However, common points 3h and 5f are not connected to form a third common line segment. As discussed above with respect to FIGS. 3 and 5, it is to be appreciated that in some embodiments, a common geometric primitive can be a single common point or multiple common points that are not connected on another. In some embodiments, data representing the generated common geometric primitive may be stored in geometric primitive database 710. Any further change to the generated common geometric primitive is applied to its child polygons.

At 816, the generated common geometric primitive is presented. In some embodiments, rendering module 704 may present the generated common geometric primitive to the user on the screen of user device 700. The common geometric primitive may be presented in a manner that is different from its child geometric primitives. Referring now to FIG. 1, common lines 102 and 104 are presented in dashed lines, while the rest of edges of polygon GP1 106, polygon GP2 108, and polygon GP3 110 are presented in solid lines for ease of distinguishing.

Figure 9:
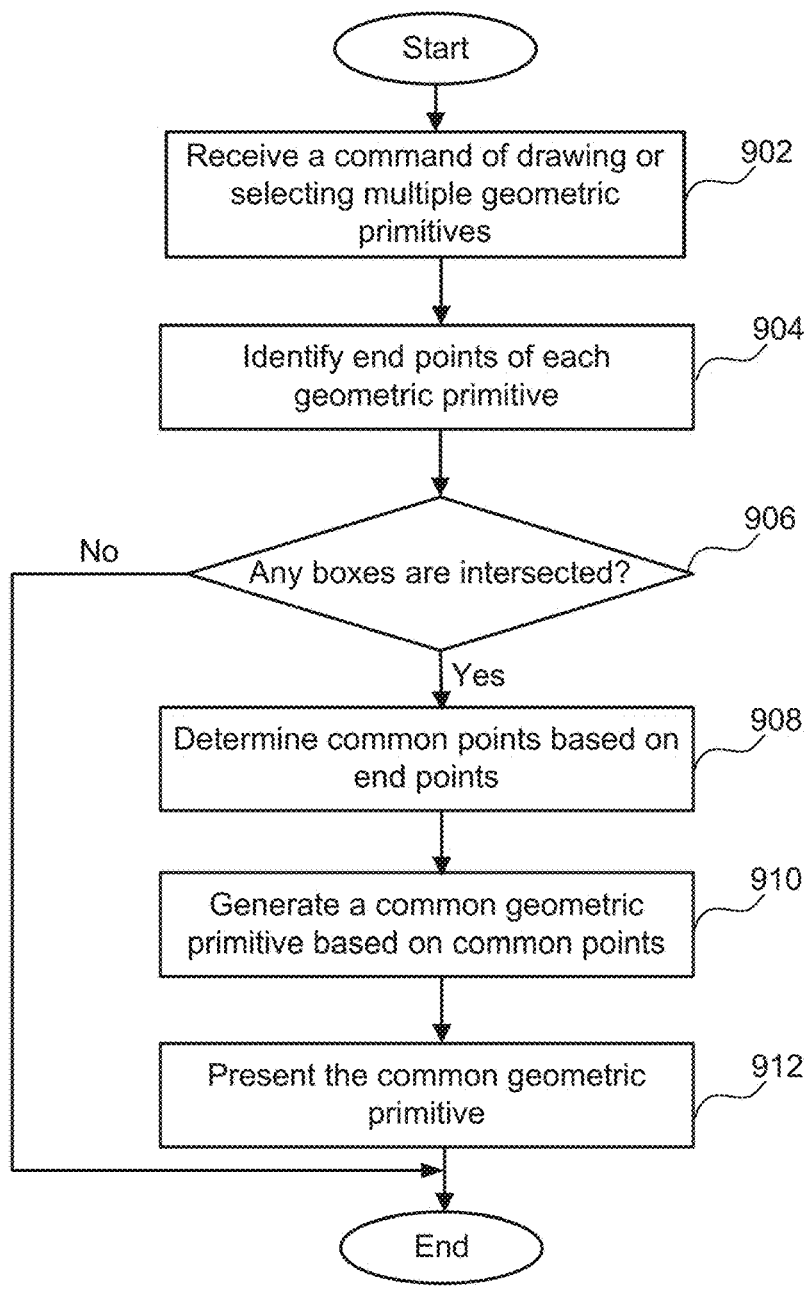
FIG. 9 is a flowchart for another example method for presenting a common geometric primitive, according to some embodiments of the disclosure.

FIG. 9 is a flowchart for another example method 900 for presenting a common geometric primitive, according to some embodiments of the disclosure. For illustrative purposes and not limitation, method 900 is described with regard to FIGS. 4 and 7. It is to be appreciated that not all steps may be needed to perform the disclosure provided herein. Further, some of the steps may be performed simultaneously, or in a different order than shown in FIG. 9, as will be understood by a person of ordinary skill in the art.

At 902, a command of drawing or selecting multiple geometric primitives is received. In some embodiments, the command may be received via GUI 706 from the user. As part of GUI 706, a GUI element may allow the user to invoke a drawing tool module to draw the geometric primitives. Referring to FIG. 4, a command may be received from the user to draw a polygon GP1 404 and a line GP2 406 individually. In some embodiments, a GUI element may allow the user to invoke a selecting tool module to select geometric primitives that are already exist and displayed on the screen. Referring to FIG. 4, a command may be received from the user to select polygon GP1 404 and line GP2 406 for further processing.

At 904, end points of each geometric primitive are identified. In some embodiments, common geometric primitive module 712 may identify the vertices of each geometric primitive. Referring to FIG. 4, a set of end points (vertices) 1, 2, and 3 are identified for polygon GP1 404, and a set of end points a and b are identified for line GP2 406.

At 906, whether any boxes of the geometric primitives are intersected is determined. If the boxes of two geometric primitives are not intersected at all, then it means the two geometric primitives are distanced enough not to have any common geometric primitive. Accordingly, method 900 ends because no common geometric primitive would be identified.

At 908, if it is determined at 906 at there are at least two boxes of the geometric primitives are intersected, then one or more common points are determined based on at least some of the end points of the geometric primitives. Each common point may be shared by at least two geometric primitives and determined based on at least two end points of a geometric primitive. In some embodiments, this determination may be made by common geometric primitive module 712. The details of determining common points are described below with respect to FIGS. 10 and 11 in various embodiments. Referring to FIG. 4, two common points 3d' and 2c' are determined as common points of polygon GP1 404 and line GP2 406. For example, common point 3d' is a vertex 3 of polygon GP1 404 and also an internal point d' that is between the two end points a and b of line GP2 406. Similarly, common point 2c' is a vertex 2 of polygon GP1 404 and also an internal point c' that is between the two end points a and b of line GP2 406.

At 910, a common geometric primitive may be generated based on the identified common points. In some embodiments, this generation may be performed by common geometric primitive module 712. For example, a common line segment may be generated by connecting two common points as described below in detail with respect to FIG. 12. Referring to FIG. 4, common line segment 402 is generated by connecting the two common points 3d' and 2c'. In some embodiments, data of the generated common geometric primitive may be stored in geometric primitive database 710. Any further change to the generated common geometric primitive is applied to its child geometric primitives.

At 912, the generated common geometric primitive is presented. In some embodiments, rendering module 704 may present the generated common geometric primitive to the user on the screen of user device 700. The common geometric primitive may be presented in a manner that is different from its child geometric primitives. Referring now to FIG. 4, common line segment 402 is presented in a dashed line, while the rest of line segments of polygon GP1 404 and line GP2 406 are presented in solid lines for ease of distinguishing.

Figure 10:
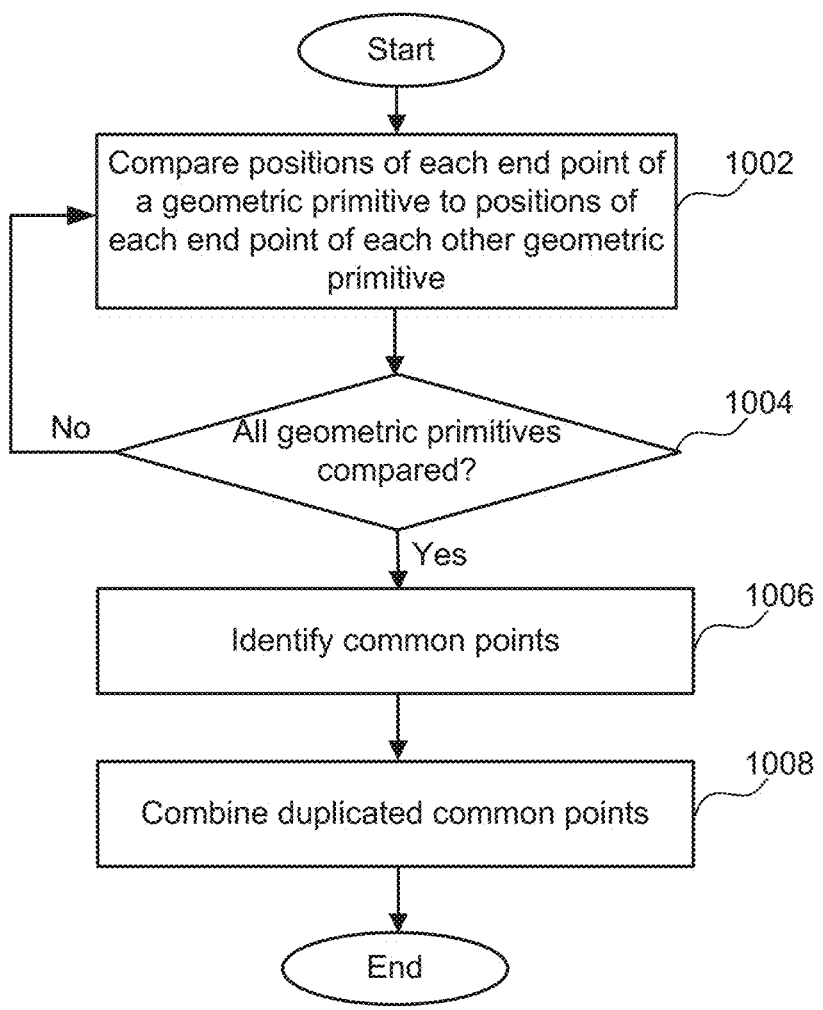
FIG. 10 is a flowchart for an example method for determining one or more common points, according to some embodiments of the disclosure.

FIG. 10 is a flowchart for an example method 1000 for determining one or more common points, according to some embodiments of the disclosure. Method 1000 may be one embodiment of 812 in FIGS. 8 and 908 in FIG. 9. For illustrative purposes and not limitation, method 1000 is described with regard to FIGS. 1, 2, and 7. It is to be appreciated that not all steps may be needed to perform the disclosure provided herein. Further, some of the steps may be performed simultaneously, or in a different order than shown in FIG. 10, as will be understood by a person of ordinary skill in the art. In some embodiments, method 1000 may be performed by common geometric primitive module 712 in conjunction with geometric primitive database 710.

At 1002, the positions of each end point of a geometric primitive is compared to the positions of each end point of each other geometric primitive. In other words, common points may be found by comparing each end point of one geometric primitive with each end point of each other geometric primitive. The comparison may be performed based on the positions of each end point, such as the 2D coordinates, that are stored as data of each geometric primitive.

Referring now to FIG. 1, taking polygon GP1 106 and polygon GP2 108 as an example, data of positions of each vertex of polygon GP1 106 and polygon GP2 108 is obtained. For polygon GP1 106, the data includes six vertices [1|(x1, y1), 2|(x2, y2), 3|(x3, y3), 4|(x4, y4), 5|(x5, y5), 6|(x6, y6)]. For polygon GP1 106, the data includes eight vertices [a|(xa, ya), yb), yc), yd), e|(xe, ye), f|(xf, yf), yg), h|(xh, yh)]. For example, the position (x1, y1) of vertex 1 of polygon GP1 106 is compared with the positions (xa, ya), (xb, yb, . . . (xh, yh) of the eight vertex a, b, . . . h of polygon GP2 108 to generate eight comparison result 1a, 1b, . . . 1h, where "1a" represents the comparison of vertex 1 against vertex a. The positions of each of the rest give vertices 2, 3, . . . 6 of polygon GP1 106 are compared with positions of each vertex a, b, h of polygon GP2 108 in the similar manner. Eventually, 48 comparison results (6×8) are generated by comparing each vertex of polygon GP1 106 against each vertex of polygon GP2 108. Then, the comparisons of each vertex of polygon GP2 108 against each vertex of polygon GP1 106 may be performed in the similar manner to generate another set of 48 comparison results (8×6). Thus, a total of 96 comparison results are generated for polygon GP1 106 and polygon GP2 108.

In some embodiments, a comparison result may indicate whether the positions of two end points from two geometric primitives (e.g., vertices of polygons) match each other, e.g., whether (x3, y3)=(xh, yh) in the example discussed above with respect to FIG. 1. It is to be appreciated that an offset margin may be set so that two end points are determined as matching each other when the offset is within the offset margin. The offset margin may be set as an absolute value, such as less than 3 pixels in each of the X and Y axes, or as a relative value, such as less than 1%.

In some embodiments, a comparison result may indicate whether the position of an end point of a geometric primitive is between two end points of another geometric primitive. Referring now to FIG. 2, the position of vertex 2 of polygon GP1 204 2|(x2, y2) is compared with the positions of each end point of polygon GP2 206 a|(xa, ya), yb), and c|(xc, yc) to see whether (x2, y2)=(xa, ya), (xb, yb), or (xc, yc) or whether (x2, y2) is between any two of (xa, ya), (xb, yb), and (xc, yc). In this example, although the vertex 2 of polygon GP1 204 does not match any vertex of polygon GP2 206, the vertex 2 is between the vertices b and c of polygon GP2 206, which is included in the comparison result for the vertex 2 of polygon GP1 204. The similar comparison result can be found for the vertex c of polygon GP2 206 as well. It is to be appreciated that any known approach for determining whether a position is between two other positions in a 2D plane can be used for making the comparison in these embodiments.

At 1004, whether all geometric primitives of interest have been compared with each other is checked. As described above, in this embodiment, the positions of each end point of a geometric primitive are compared with the positions of each end point of each other geometric primitive. Thus, if the result of 1004 is "no," then method 1000 returns back to 1002.

At 1006, if end points of all geometric primitives of interest have been compared with each other at 1004, common positions may be identified based on the comparison results. As described above, a common point may be identified when the comparison result indicates that an end point of one geometric primitive matches another end point of another geometric primitive (either exactly or within the offset margin) or when the comparison result indicates that the end point of one geometric primitive is between two end points of the other geometric primitive. In one example, the common point 3h in FIG. 1 may be identified because the vertex 3 of polygon GP1 106 matches the vertex h of polygon GP2 108. In another example, the common point 2d' in FIG. 2 may be identified because the vertex 2 of polygon GP1 204 is between the two end points c and d of polygon GP 206, even though the vertex 2 of polygon GP1 204 does not match any vertices of polygon GP2 206 (i.e., the common point 2d's is an internal point of polygon GP2 206).

As described above with respect to 1002 and 1004, in some embodiments, the comparisons are order-sensitive. In other words, the comparison result (and identified common point if any) of a first end point of a first geometric primitive against a second end point of a second geometric primitive is separately obtained from the comparison result (and identified common point if any) of the second end point of the second geometric primitive against the first end point of the first geometric primitive. Continuing the example discussed above with respect to FIG. 1, a set of six common points 3h, 4g, 5f, h3, g4, and f5 may be identified for polygon GP1 106 and polygon GP2 108. The common points 3h, 4g, 5f are identified from the comparison results of polygon GP1 106 against polygon GP2 108, while the common points h3, g4, f5 are identified from the comparison results of polygon GP2 108 against polygon GP1 106.

At 1008, duplicated common points may be combined. Some common points identified at 1006 may actually be the same (with the same position), even though they are identified as separate common points because they are generated from different comparison orders (e.g., comparing a first geometric primitive against a second geometric primitive and comparing the second geometric primitives against the first geometric primitive are in different comparison orders). These duplicated common points may be identified and combined. For example, referring to FIG. 1, the common points 3h, 4g, and 5f are duplicated with respect to the common points h3, g4, and f5, respectively, and thus may be combined to generate a set of de-duplicated common points 3h, 4g, 5f for polygon GP1 106 and polygon GP2 108.

Figure 11:
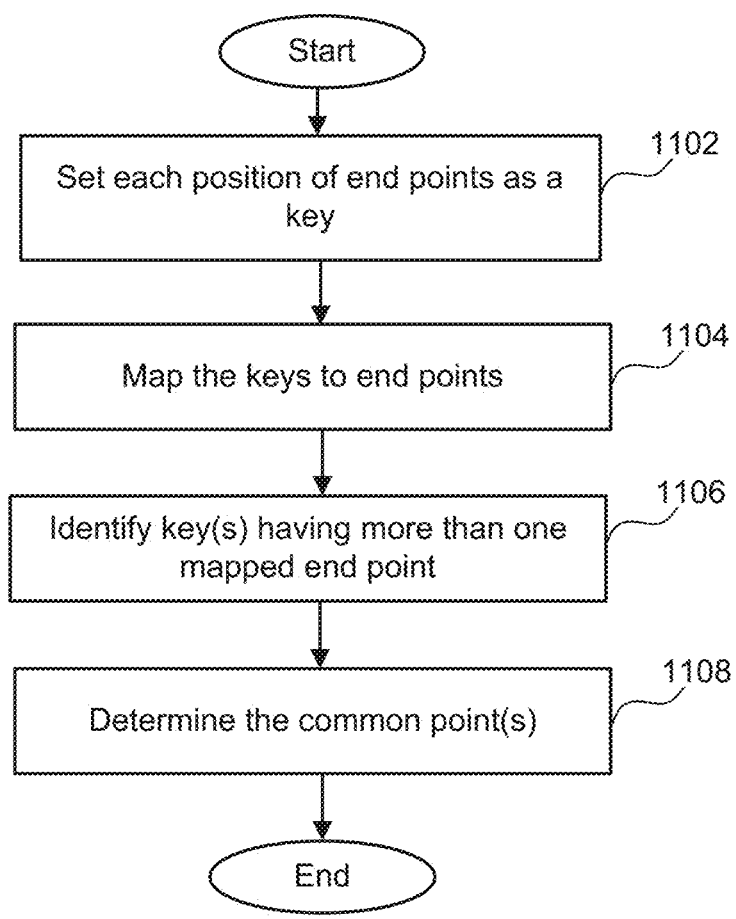
FIG. 11 is a flowchart for another example method for determining one or more common points, according to some embodiments of the disclosure.

FIG. 11 is a flowchart for another example method 1100 for determining one or more common points, according to some embodiments of the disclosure. Method 1100 may be one embodiment of 812 in FIGS. 8 and 908 in FIG. 9. Instead of making order-sensitive comparisons between all end points of all geometric primitives of interest as described above with respect to FIG. 10, a key-based mapping approach is described now with respect to FIG. 11, which may reduce computation complexity. For example, a hash table or hash map may be used for recording the comparison results. For illustrative purposes and not limitation, method 1100 is described with regard to FIGS. 1 and 7. It is to be appreciated that not all steps may be needed to perform the disclosure provided herein. Further, some of the steps may be performed simultaneously, or in a different order than shown in FIG. 11, as will be understood by a person of ordinary skill in the art. In some embodiments, method 1100 may be performed by common geometric primitive module 712 in conjunction with geometric primitive database 710.

At 1102, each position of all end points of the geometric primitives of interest may be set as a key. As a position is unique, each key is unique either. Referring now to FIG. 1, for polygon GP1 106 and polygon GP2 108, their 14 vertices are associated with 11 unique positions (x1, y1), (x2, y2), (x3, y3), (x4, y4), (x5, y5), (x6, y6), (xa, ya), (xb, yb), (xc, yc), (xd, yd), and (xe, ye), each of which may be set as a key, for example, a hash key in a hash table.

At 1104, the keys may be mapped to all the end points of the geometric primitives. For example, a hash table may be created to map each hash key representing a unique position to one or more end points of the geometric primitives. The mapping may be represented in the form of [(x,y)|(GP1, ep 1), (GP2, ep 2) . . . (GPn, ep n)], where (x, y) is the position key, GPn is a geometric primitive, and ep n is an end point of the geometric primitive that has the same position as the position key (x, y). In the example discussed above with respect to FIG. 1, the position key (x1, y1) may be mapped to the vertex 1 of polygon GP 106, e.g., represented as [(x1, y1)|(GP1, 1)]. Some position keys may be mapped to more than one end point. For example, the position key (x3, y3) (which can be interchangeably represented as (xh, yh) because they represent the same position) may be mapped to both vertex 3 of polygon GP 106 and vertex h of polygon GP 2 108, e.g., represented as [(x3, y3)|(GP1, 3), (GP2, h)], because both vertices 3 and h have the same position as the position key (x1, y1). The same mapping operation is repeated for each key until all the end points of the geometric primitives are mapped to one of the keys.

At 1106, keys that have more than one mapped end point are identified. For example, in a hash table, hash keys that have a hash value greater than 1 are identified. In the example discussed above with respect to FIG. 1, three keys may be identified because each of them is mapped to two end points: position key (x3, y3) is mapped to vertices 3 and h, position key (x4, y4) is mapped to vertices 4 and g, and position key (x5, y5) is mapped to vertices 5 and f.

At 1108, the common points are determined based on the identified keys having more than one mapped end point. Continuing the example discussed above with respect to FIG. 1, three common points 3h, 4g, and 5f may be determined as they correspond to the identified keys (x3, y3), (x4, y4), and (x5, y5), respectively, each of which is mapped to more than one vertex. Because the operations at 1102 and 1104 are linear operations, the computation complexity of determining the common points can be reduced by method 1100.

Figure 12:
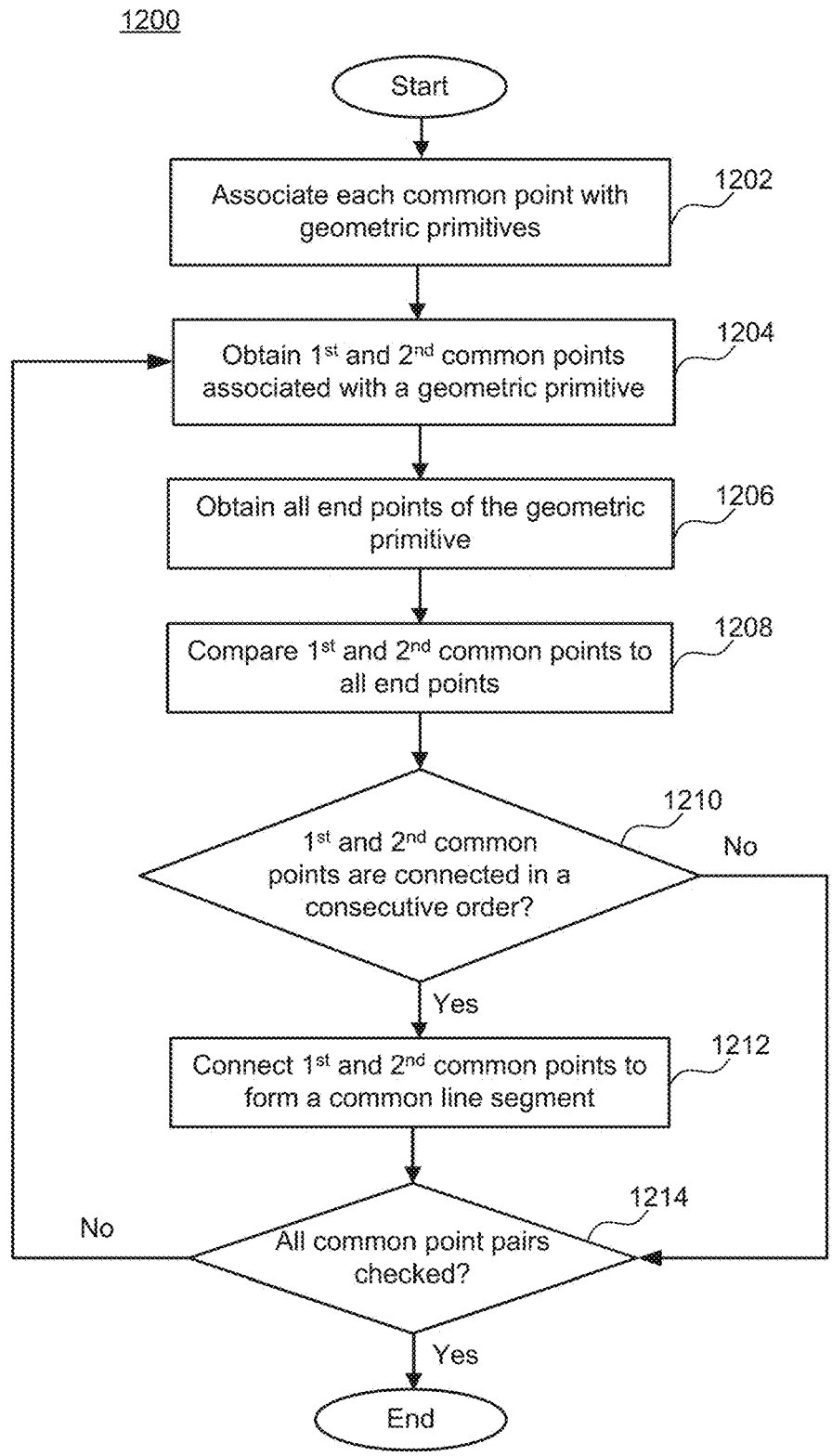
FIG. 12 is a flowchart for an example method for generating a common line segment, according to some embodiments of the disclosure.

FIG. 12 is a flowchart for an example method 1200 for generating a common line segment, according to some embodiments of the disclosure. Method 1200 may be one embodiment of 814 in FIGS. 8 and 910 in FIG. 9. For illustrative purposes and not limitation, method 1200 is described with regard to FIGS. 1 and 7. It is to be appreciated that not all steps may be needed to perform the disclosure provided herein. Further, some of the steps may be performed simultaneously, or in a different order than shown in FIG. 12, as will be understood by a person of ordinary skill in the art. In some embodiments, method 1200 may be performed by common geometric primitive module 712 in conjunction with geometric primitive database 710.

At 1202, each common point that has been determined by any method described in this disclosure is associated with its child geometric primitives. In other words, the common points may be grouped based on their child geometry primitives. In some embodiments, a list may be created for each geometric primitive with its associated common points, e.g., represented in the form of [GPn, cp 1, cp 2 . . . cp n], where GPn is the geometric primitive and cp n is each common point that is included in the geometric primitive. Referring now to FIG. 1, for polygon GP1 106, a list of common points may be created as [GP1, 3h, 4g, 5f]. Similarly, for polygon GP2 108, a list of common points may be created as [GP2, 3h, 4g, 5g, cE, dD, eC].

At 1204, for each geometric primitive of interest, a pair of common points associated with the geometric primitive (i.e., the first and second common points) are obtained. In the example discussed above with respect to FIG. 1, for polygon G1 106, three pairs of common points may be obtained, including (3h, 4g), (3h, 5f), and (4g, 5f).

At 1206, all end points of the geometric primitive are obtained. As discussed above, data of a geometric primitive may be stored in geometric primitive database 710 in any suitable data suture, such as lists, by the end points of the geometric primitive. The end points may be stored in a consecutive order, which is part of the stored data of the geometric primitives. In the example with respect to FIG. 1, all vertices of polygon GP1 106 may be obtained from geometric primitive database 710, including 1, 2, 3, 4, 5, and 6 in such a consecutive order. Similarly, all vertices of polygon GP2 108 may be obtained from geometric primitive database 710, including a, b, c, d, e, f, g, and h in such a consecutive order.

At 1208, a pair of first and second common points associated with the geometric primitive are compared to all the end points of the geometric primitive obtained at 1206. For example, each pair of common points associated with polygon GP1 106 (3h, 4g), (3h, 5f), and (4g, 5f) are compared to all the vertices of polygon GP1 106 1, 2, 3, 4, 5, and 6.

At 1210, whether the pair of common points are connected in a consecutive order is determined based on the comparison at 1208. For example, based on the comparison, if the first common point corresponds to a first end point that is the predecessor or successor of a second end point corresponding to the second common point, then the first and second common points are in a consecutive order and thus, shall be connected. Otherwise, the pair of common points are separate common points that shall not be connected. In other words, if the end points corresponding to the pair of common points are adjacent to each other in the child geometric primitive, then the pair of common points are connected in a consecutive order. In the example discussed above with respect to FIG. 1, the pair of common points (3h, 4g) are connected in a consecutive order because their corresponding vertices 3 and 4 in polygon GP1 106 are adjacent to each other in the list. Similarly, the pair of common points (4g, 5f) are connected in a consecutive order because their corresponding vertices 4 and 5 in polygon GP1 106 are adjacent to each other in the list. On the other hand, the pair of common points (3h, 5f) are not connected in a consecutive order because their corresponding vertices 3 and 5 in polygon GP1 106 are not adjacent to each other in the list.

If the answer of 1210 is "yes," then method 1200 proceeds to 1212 where the pair of first and second common points are connected to form a common line segment. Continuing the example with respect to FIG. 1, the pair of common points (3h, 4g) are connected to form a common line segment 3h-4g, and the pair of common points (4g, 5f) are connected to form another common line segment 4g-5f.

If the answer of 1210 is "no," then method 1200 proceeds to 1214. At 1214, whether all common point pairs have been checked is determined. That is, each pair of common points associated with each geometric primitive of interest shall be checked to see if a common line segment is formed by connecting the pair of common points. In the example with respect to FIG. 1, four common line segments 3h-4g, 4g-5f, cE-dD, and dD-eC are formed. If there is any common point pair that has not been checked yet, method 1200 returns back to 1204 to repeat the operations at 1204-1212 for the next unchecked common point pair.

Figure 13:
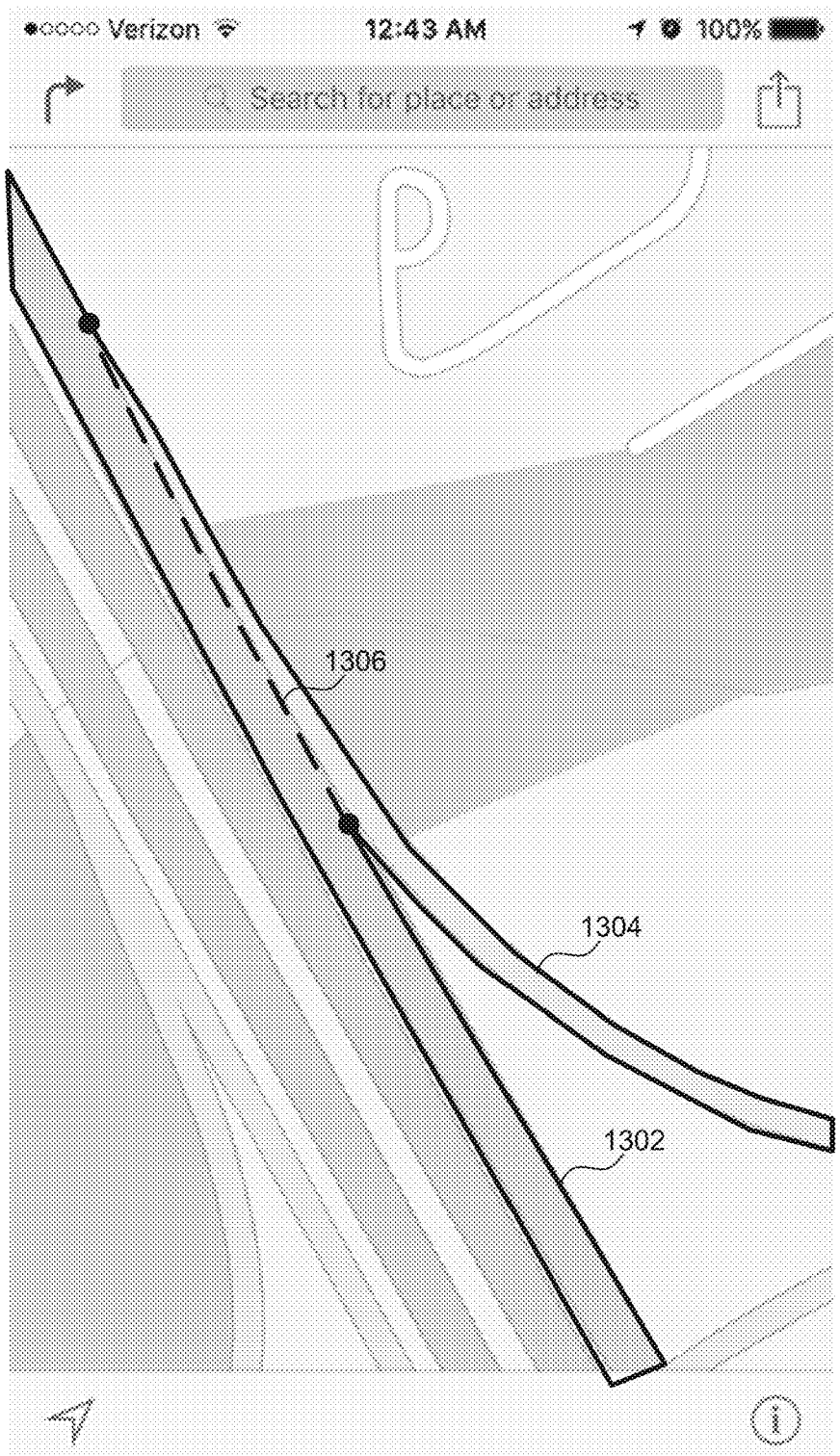
FIG. 13 illustrates an example of identifying and processing a common line on a digital map, according to some embodiments of the disclosure.

FIG. 13 illustrates an example of identifying and processing a common line 1306 on a digital map 1300, according to some embodiments of the disclosure. In this example, digital map 1300 is presented on the screen of user device 700. In one example, a first polygon 1302 may be drawn by a user along the boundaries of a road, and a second polygon 1304 may be separately drawn by the user along the boundaries of a ramp meeting the road at a common edge. In another example, a polygon following the boundaries of both the road and the ramp may be automatically generated and presented to the user. The user then may slice the polygon along the common edge where the road and the ramp are met to generate two polygons 1302 and 1304. In any event, by using the common geometric primitive identifying and processing techniques described above in this disclosure, common line 1306 can be automatically generated and presented in a manner that is different from polygons 1302 and 1304. If the user wants to make any change to common line 1306, the same change will be automatically reflected to polygons 1302 and 1304 at runtime. Thus, the user no longer needs to manually apply the same change on common line 1306 to polygons 1302 and 1304, which involves tedious, time consuming, and inaccurate operations. It is to be appreciated that FIG. 13 shows one example use case of the common geometric primitive identifying and processing techniques, which can be expanded to any suitable use cases within the scope and spirit of this disclosure, such as but not limited to, computer-aided design, city planning, entertainment, education, etc.

Figure 14:
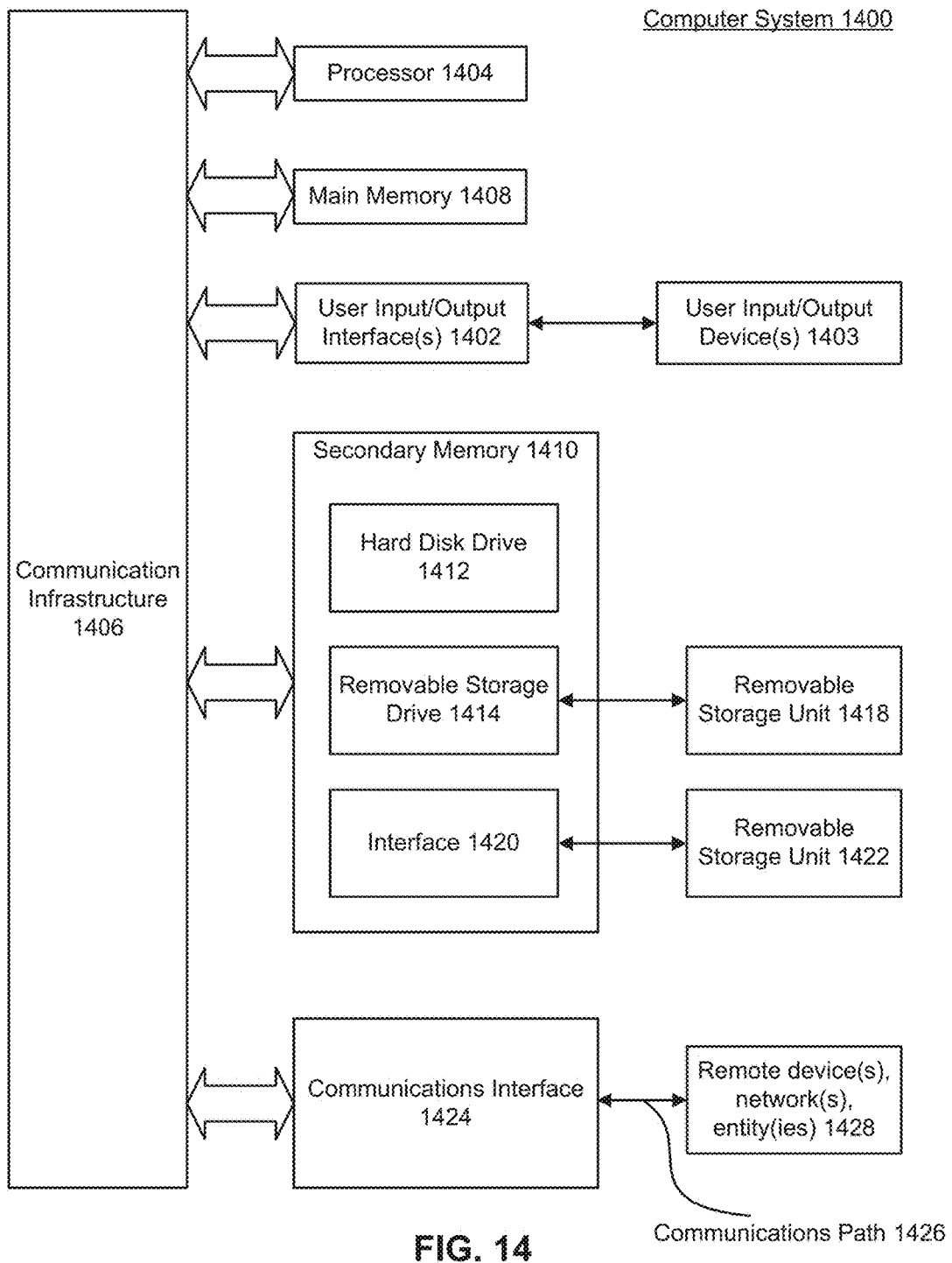
FIG. 14 is an example computer system useful for implementing various embodiments or portion(s) thereof.

Various embodiments can be implemented, for example, using one or more computer systems, such as computer system 1400 shown in FIG. 14. Computer system 1400 can be any well-known computer capable of performing the functions described herein. For example, and without limitation, user device 700 (and/or other apparatuses and/or components shown in the figures) and flowcharts of FIGS. 8-12 may be implemented using one or more computer systems 1400, or portions thereof.

Computer system 1400 includes one or more processors (also called central processing units, or CPUs), such as a processor 1404. Processor 1404 is connected to a communication infrastructure or bus 1406.

Computer system 1400 also includes user input/output device(s) 1403, such as monitors, keyboards, pointing devices, etc., that communicate with communication infrastructure 1406 through user input/output interface(s) 1402.

Computer system 1400 also includes a main or primary memory 1408, such as random access memory (RAM). Main memory 1408 may include one or more levels of cache. Main memory 1408 has stored therein control logic (i.e., computer software) and/or data.

Computer system 1400 may also include one or more secondary storage devices or memory 1410. Secondary memory 1410 may include, for example, a hard disk drive 1412 and/or a removable storage device or drive 1414. Removable storage drive 1414 may be a floppy disk drive, a magnetic tape drive, a compact disk drive, an optical storage device, tape backup device, and/or any other storage device/drive.

Removable storage drive 1414 may interact with a removable storage unit 1418. Removable storage unit 1418 includes a computer usable or readable storage device having stored thereon computer software (control logic) and/or data. Removable storage unit 1418 may be a floppy disk, magnetic tape, compact disk, DVD, optical storage disk, and/any other computer data storage device. Removable storage drive 1414 reads from and/or writes to removable storage unit 1418 in a well-known manner.

According to an exemplary embodiment, secondary memory 1410 may include other means, instrumentalities or other approaches for allowing computer programs and/or other instructions and/or data to be accessed by computer system 1400. Such means, instrumentalities or other approaches may include, for example, a removable storage unit 1422 and an interface 1420. Examples of the removable storage unit 1422 and the interface 1420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1400 may further include a communication or network interface 1424. Communication interface 1424 enables computer system 1400 to communicate and interact with any combination of remote devices, remote networks, remote entities, etc. (individually and collectively referenced by reference number 1428). For example, communication interface 1424 may allow computer system 1400 to communicate with remote devices 1428 over communications path 1426, which may be wired and/or wireless, and which may include any combination of LANs, WANs, the Internet, etc. Control logic and/or data may be transmitted to and from computer system 1400 via communication path 1426.

In an embodiment, a tangible apparatus or article of manufacture comprising a tangible computer useable or readable medium having control logic (software) stored thereon is also referred to herein as a computer program product or program storage device. This includes, but is not limited to, computer system 1400, main memory 1408, secondary memory 1410, and removable storage units 1418 and 1422, as well as tangible articles of manufacture embodying any combination of the foregoing. Such control logic, when executed by one or more data processing devices (such as computer system 1400), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 14. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of this disclosure as contemplated by the inventor(s), and thus, are not intended to limit this disclosure or the appended claims in any way.

While this disclosure has been described herein with reference to exemplary embodiments for exemplary fields and applications, it should be understood that this disclosure is not limited thereto. Other embodiments and modifications thereto are possible, and are within the scope and spirit of the present disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of this disclosure should not be limited by any of the above-described exemplary embodiments, but should be defined only in accordance with the following claims and their equivalents.

What is claimed is:

1. A method, comprising:
   obtaining, by at least one processor, a first geometric primitive comprising a first set of end points including a first end point and a second geometric primitive comprising a second set of end points including a second end point;
   generating, by the at least one processor, a common geometric primitive including a first common point and a second common point, the generating comprising associating the first common point and the second common point with both the first geometric primitive and the second geometric primitive, creating a common line segment of the common geometric primitive connecting the first common point and the second common point, and storing the common geometric primitive as a new primitive separate from the first geometric primitive and the second geometric primitive;
   configuring, by the at least one processor, the common geometric primitive in a parent/child relationship with the first geometric primitive and the second geometric primitive, wherein the parent/child relationship establishes that a change made to the common geometric primitive as a parent is applied to the first geometric primitive and the second geometric primitive as children;
   receiving, by the at least one processor, a change made to the first common point of the common geometric primitive, wherein the first common point is associated with the first end point of the first geometric primitive and the second end point of the second geometric primitive; and
   applying, by the at least one processor, the change made to the first common point of the common geometric primitive to the first end point of the first geometric primitive and to the second end point of the second geometric primitive in accordance with the parent/child relationship.

2. The method of claim 1, further comprising:
   comparing a position of each end point of the first set of end points to a position of each end point of the second set of end points; and
   based on at least the comparing, identifying the common point.

3. The method of claim 1, further comprising:
   mapping positions of the first and second sets of end points to each end point of the first and second sets of end points; and
   based on at least the mapping, identifying the common point.

4. The method of claim 1, further comprising:
   determining, by the at least one processor, an additional common point that is shared by at least one of the first geometric primitive and the second geometric primitive;
   wherein generating the common geometric primitive comprises:
      associating each of the common point and the additional common point with at least one of the first geometric primitive and the second geometric primitive,
      for each of the first geometric primitive and the second geometric primitive, comparing the common point or the additional common point associated with the geometric primitive to the set of end points of the geometric primitive,
      based on at least the comparing, determining that the common point and the additional common point are connected in a consecutive order, and
      based on at least the determining, generating a common line segment connecting the common point and the additional common point.

5. The method of claim 1, wherein the obtaining comprises:
displaying a geometric primitive in a first manner;
receiving a command of slicing the geometric primitive into the first geometric primitive and the second geometric primitive; and
identifying the first set of end points of the first geometric primitive and the second set of end points of the second geometric primitive.

6. The method of claim 5, further comprising:
displaying, by the at least one processor, the common geometric primitive in a second manner.

7. The method of claim 1, wherein the obtaining comprises:
receiving a command of drawing or selecting the first geometric primitive and the second geometric primitive; and
identifying the first set of end points of the first geometric primitive and the second set of end points of the second geometric primitive.

8. The method of claim 1, further comprising:
determining, by the at least one processor, that a first box of the first geometric primitive intersects a second box of the second geometric primitive.

9. The method of claim 1, further comprising:
in response to a command, removing, by the at least one processor, the common geometric primitive while maintaining the first geometric primitive and the second geometric primitive.

10. A system, comprising:
a memory; and
at least one processor coupled to the memory and configured to:
obtain a first polygon comprising a first set of vertices including a first vertex and a second polygon comprising a second set of vertices including a second vertex,
generate a common line including a first common point and a second common point, the generating comprising associating the first common point and the second common point with both the first polygon and the second polygon, creating the common line by connecting the first common point and the second common point, and storing the common line as a new primitive separate from the first polygon and the second polygon,
configure the common line in a parent/child relationship with the first polygon and the second polygon, wherein the parent/child relationship establishes that a change made to the common line as a parent is applied to the first polygon and the second polygon as children,
receive a change made to the first common point of the common line, wherein the first common point is associated with the first vertex of the first polygon and the second vertex of the second polygon, and
apply the change made to the first common point of the common line to the first vertex of the first polygon and to the second vertex of the second polygon in accordance with the parent/child relationship.

11. The system of claim 10, the at least one processor further configured to:
compare a position of each vertex of the first set of vertices to a position of each vertex of the second set of vertices; and
based on at least the comparing, identifying the common point.

12. The system of claim 10, the at least one processor further configured to:
map positions of the first and second sets of vertices to each vertex of the first and second sets of vertices; and
based on at least the mapping, identify the common point.

13. The system of claim 10, the at least one processor further configured to:
determine an additional common point that is shared by at least one of the first polygon and the second polygon;
associate each of the common point and the additional common point with at least one of the first polygon and the second polygon;
for each of the first polygon and the second polygon, compare the common point or the additional common point associated with the polygon to the set of vertices of the polygon;
based on at least the comparing, determine that the common point and the additional common point are connected in a consecutive order; and
based on at least the determining, generate a common line segment connecting the common point and the additional common point.

14. The system of claim 10, wherein to obtain, the at least one processor is further configured to:
display a polygon in a first manner;
receive a command of slicing the polygon into the first polygon and the second polygon; and
identify the first set of vertices of the first polygon and the second set of vertices of the second polygon.

15. The system of claim 14, the at least one processor further configured to:
display the common line in a second manner.

16. The system of claim 10, wherein to obtain, the at least one processor is further configured to:
receive a command of drawing or selecting the first polygon and the second polygon; and
identify the first set of vertices of the first polygon and the second set of vertices of the second polygon.

17. The system of claim 10, the at least one processor further configured to:
determine that a first box of the first polygon intersects a second box of the second polygon.

18. The system of claim 10, the at least one processor further configured to:
in response to a command, remove the common line while maintaining the first polygon and the second polygon.

19. A non-transitory computer-readable device having instructions stored thereon that, when executed by at least one computing device, causes the at least one computing device to perform operations comprising:
displaying a polygon in a first manner;
receiving a command of slicing the polygon into a first polygon and a second polygon;
identifying a first set of vertices of the first polygon including a first vertex and a second set of vertices of the second polygon including a second vertex;
generating a common line including a first common point and a second common point, the generating comprising associating the first common point and the second common point with both the first polygon and the second polygon, creating the common line by connecting the first common point and the second common point, and storing the common line as a new primitive separate from the first polygon and the second polygon;
configuring the common line in a parent/child relationship with the first polygon and the second polygon, wherein the parent/child relationship establishes that a change made to the common line as a parent is applied to the first polygon and the second polygon as children;

displaying the common line in a second manner;

receiving a change made to the first common point of the common line, wherein the first common point is associated with the first vertex of the first polygon and the second vertex of the second polygon; and applying the change made to the first common point of the common line to the first vertex of the first polygon and to the second vertex of the second polygon in accordance with the parent/child relationship.

20. The computer-readable device of claim 19, the operations further comprising:

in response to another command, removing the common line while maintaining the first polygon and the second polygon.

\* \* \* \* \*